Figures 1, 2:
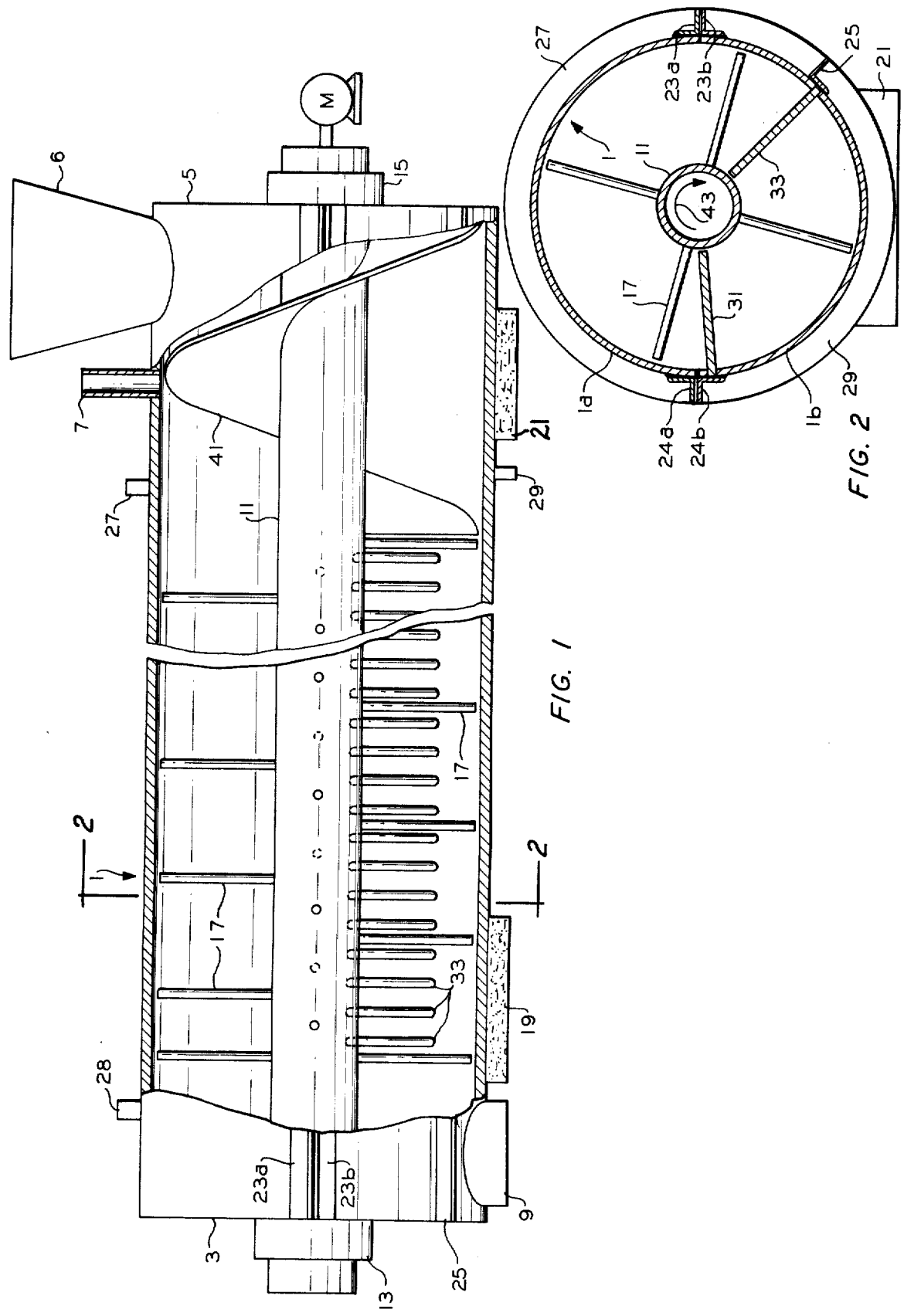

United States Patent [19]

Austin

[11] 4,061,316
[45] Dec. 6, 1977

[54] CARBON BLACK PELLETER
[75] Inventor: Oliver K. Austin, Bartlesville, Okla.
[73] Assignee: Phillips Petroleum Company, Bartlesville, Okla.
[21] Appl. No.: 714,933
[22] Filed: Aug. 16, 1976
[51] Int. Cl.² ............................................. B01F 7/02
[52] U.S. Cl. ..................................... 366/303; 366/319
[58] Field of Search ............ 259/110, 57, 65, DIG. 22, 259/9, 182; 23/285, 286, 314

[56] References Cited
U.S. PATENT DOCUMENTS

| 2,213,056 | 8/1940 | Skoog et al. | 259/9 |
| 2,480,782 | 8/1949 | Skoog | 259/57 |
| 3,825,233 | 7/1974 | Henderson | 259/182 |
| 3,897,218 | 7/1975 | Busweiler | 23/285 |

Primary Examiner—Leonard D. Christian

[57] ABSTRACT

A carbon black pelleter having a pinned shaft rotatably arranged in a cylindrical housing is provided with one or more rows of pins (shell pins) attached to the housing in the lower half of the housing. The shaft pins during one revolution of the shaft are sandwiched between the shell pins, but not more than 1/6 of the entire sandwiching during one revolution of the shaft occurs at the same moment.

11 Claims, 2 Drawing Figures

U.S. Patent     Dec. 6, 1977     4,061,316

CARBON BLACK PELLETER

The present invention relates to carbon black pellet production. More specifically the present invention relates to a carbon black pelleter.

BACKGROUND OF THE INVENTION

Carbon black is generally produced by pyrolytic decomposition of hydrocarbons. A carbon black containing smoke is generated. The carbon black is separated from the smoke, e.g., by filtration. Thus a flocculent carbon black product is obtained. This flocculent carbon black product is difficult to handle. Thus it is common practice to convert the flocculent carbon black into pellets.

Various carbon black pelleters have been disclosed in the prior art. One such pelleter comprises a housing with two parallel rotatably arranged shafts. The shafts both are provided with pins that are arranged in four comb-like structures on each shaft. During a rotation of the shaft, the interdigitating pin combs pass through each other. This apparatus is rather complicated and expensive.

Another carbon black pelleter disclosed in the prior art comprises a rotatable housing with pins attached to the housing pointing radially inwardly. A shaft may be rotatably or stationary arranged in the housing. This shaft is provided with pins arranged along a helical line. The pins on the housing are arranged in a symmetrical pattern all over the housing. This apparatus has the disadvantage of being also fairly complicated because the attachment of the pins to the housing is cumbersome and servicing of this apparatus is rather difficult. Also the specific arrangement of housing pins and shaft pins, both essentially in helical patterns, prevents strong mechanical action on the carbon black.

Another known carbon black pelleter is provided with a rotatable housing having several pins extending radially inwardly and a shaft having pins extending radially outwardly. The housing pins and the shaft pins are slightly spaced from each other so that the mechanical action is fairly strong. However, the apparatus is still difficult to be built and to be serviced in view of the fact that the pins are attached to the rotatable housing all over the entire interior surface thereof.

THE INVENTION

It is thus one object of this invention to provide a new pelleter.

Another object of this invention is to provide a carbon black pelleter that is capable of a strong mechanical action on the pelleting mixture.

A further object of this invention is to provide a carbon black pelleter that can be readily built and easily serviced.

Yet another object of this invention is to provide a carbon black pelleter having a strong mechanical action on the mass to be pelleted but at the same time avoids any undue surging of the power input to a driving motor of the pelleter.

These and other objects, advantages, features, details and embodiments of the invention will become apparent to those skilled in the art from the following detailed description thereof, the appended claims and the drawing in which FIG. 1 is a view which shows a carbon black pelleter partially broken open, and FIG. 2 is a view which shows a cross-section of a carbon black pelleter shown in FIG. 1 taken along line 2—2.

In accordance with this invention, it has now been found that by arranging shell pins extending radially inwardly from an essentially cylindrically shaped housing in one or more rows essentially parallel to the longitudinal axis of the housing in the lower half of the housing, and by arranging pins extending radially outwardly from a shaft rotatably arranged within this housing in such a manner that every shaft pin is, during one rotation, at least once sandwiched between two shell pins but that not more than about 1/6 of the total sandwiching of the shaft pins during one rotation of the shaft occurs at the same time, a carbon black pelleter is provided that can be both readily built and easily serviced and that does not cause any excessive surging on the motor driving the shaft within the stationary housing.

By the feature of this invention that during one rotation not more than 1/6 of the total sandwiching or sandwiching action of this one rotation occurs at the same time, the following is meant: If every sandwiching of any individual shaft pin is looked at as a sandwiching event and if N such sandwiching events occur during one revolution of the shaft, then in accordance with the feature discussed not more than N/6 sandwiching events occur simultaneously. In case the shell pins are arranged along $n$ rows (or comb-like structures) with the axes of the shell pins in each one row all being parallel to each other and in a common plane with $n$ being an integer of 1 to 4, preferably 2, and if the shaft pins are arranged in $m$ parallel rows with the axis of the shaft pins in each one of these rows parallel to each other and in a common plane, $m$ being 2 or more, and if the arrangement of shell pin rows and shaft pin rows is such that not more than one shaft pin row is simultaneously sandwiched by shell pin rows, the above-identified feature can mathematically be characterized by the formula:

$$n \cdot m \geq 6$$

because $n \cdot m$ sandwichings of rows occur; it is assumed here that the number of shaft pins in each shaft pin row is about the same and that the number of shell pins in each shell pin row is approximately the same. It has to be emphasized that the axial distance between adjacent shaft pins in a shaft pin row in this specific embodiment can be and preferably is considerably larger than the axial distance between adjacent shell pins in a shell pin row. In this embodiment, therefore, with a preselected number $n$ of shell pin rows, the minimal number $m$ of shaft pin rows is $6/n$.

Thus in accordance with this invention, a carbon black pelleter is provided which comprises a housing having an essentially cylindrically shaped internal surface. A shaft is coaxially and rotatably arranged within this housing. A plurality of shaft pins are attached to the shaft. These shaft pins extend radially outwardly from the shaft. A plurality of shell pins are attached to the housing. These shell pins extend radially inwardly from the housing. The shell pins are arranged in at least one row or comb-like structure essentially parallel to the shaft axis. All of the shell pins are arranged in the lower half of the housing. The shaft pins in turn are arranged on the shaft in such a pattern with respect to the rows of shell pins that the shaft pins do not touch the shell pins during the rotation of the shaft within the stationary housing, and so that every shaft pin during one rotation of the shaft is at least once sandwiched between two shell pins and that during one rotation of the shaft not more than about 1/6 of the total sandwiching of one rotation occurs at the same time. By the term "sandwiched", an arrangement of pins is meant in which a shaft pin is in a position between two shell pins with a narrow distance to these two shell pins and with the three axes of the two shell pins and the one shaft pin being essentially parallel to each other and in one common plane. The open axial space (clearance) between the facing surfaces of a shaft pin and one of the shell pins sandwiching this shaft is preferably about 0.1 to 0.5 inch. Preferably, the distance between the centers of two axially adjacent cylindrical shell pins is about 30% to about 60% larger than the sum of the diameter of one shell pin and one shaft pin.

The carbon black pelleter is provided with means for introducing carbon black into the space between the shaft and the housing, as well as with means for introducing a pelleting liquid into the space mentioned. Furthermore, the pelleter is provided with means for withdrawing carbon black pellets therefrom. These elements in their specific design are not critical and as such these elements are well known in the art of carbon black pelleters. Thus a detailed description thereof can be avoided.

The shell pins are arranged in one or more rows essentially parallel to the longitudinal axis of the housing or the longitudinal axis of the shaft. Whereas these shell pins can be arranged in only one row, or e.g., up to four rows, it is presently preferred to have two rows of shell pins attached to the lower half of the housing. The lower half of the housing is that portion of the housing that constitutes the bottom half of the housing when the pelleter is installed with the longitudinal axis essentially horizontally arranged. Preferably the shell pins are arranged within these rows equidistantly. Thus the distance between the shell pins is the same throughout the entire row of shell pins.

The length of the shell pins is not critical. They can reach from the housing into proximity of the shaft. It is, however, also within the scope of this invention to use shorter shell pins; thus the shell pins can be about ⅛ to about ¼ of the radial distance between the inside of the housing and the shaft. In case of a pelleter having a housing with an internal diameter of 22 inches and a shaft with a diameter of 6 inches, the short shell pins can be 1 to 4 inches long.

The shape of the shaft pins and shell pins is not critical. Preferably the shaft pins and/or the shell pins are either in the shape of a rod with circular cross-section or in the shape of a flat strap with the narrow edge of the strap facing in the direction of rotation. The preferred shape of the shell pins and the shaft pins is that of a rod with circular cross-section.

The shaft pins and the shell pins can be made out of such corrosion resistant materials as stainless steel. These pins can also have an abrasion resistant surface or the tips of these pins can be made out of or coated with abrasion resistant materials such as ceramics.

The shaft pins are attached to the shaft in such a manner that they can pass through the space between the shell pins during the rotation of the shaft without touching the shell pins. When the individual shaft pin passes through the row of shell pins, this shaft pin is being sandwiched between the two shell pins and thus a strong mechanical action is carried out on the material that is present in the area between the two shell pins.

It is one feature of this invention that during the rotation of the shaft never more than about 1/6 of the shaft pins are sandwiched between shell pins at the same time. Thus no excessive surging on the motor driving the shaft occurs. It is presently preferred to arrange the shaft pins along the shaft in a helical pattern so that the axial distance between the shaft pins is the same and that the angular distance between the shaft pins along the helical pattern is about 90°. This arrangement results in a shaft pin pattern of four comb-like structures. Together with two rows of shell pins, the entire work carried out during the various sandwiching steps is divided into eight portions during one entire revolution of the shaft. It is important to note that in accordance with this invention never more than about 1/6 of the total sandwiching of the shaft pins between the shell pins of one shaft revolution occurs at the same time.

By arranging the shaft pins in an essentially helical pattern, shell pins are essentially never sandwiched between two shaft pins, whereas every shaft pin is at least once sandwiched between two shell pins during the rotation of the shaft. If the shaft pins are arranged in a pattern of at least three comb-like structures having the same azimuthal angular distance from each other, a rather smooth and even operation of the pelleter can be achieved. By "comb-like structure" an arrangement of pins is meant in which the pins all have essentially the same azimuthal angular location on the shaft but different axial locations. When two rows of shell pins are utilized that have an azimuthal angular distance from each other which is an odd multiple of one half of the azimuthal angular distance of three or more comb-like structures of the shaft pins, at least six interdigitations of the shaft pins with the shell pin rows occur during one revolution of the shaft. In addition the interdigitations in this embodiment that are related to a higher power input into the pelleter occur with a constant time interval between consecutive interdigitations. Thus in the case of the shaft pins being arranged in four comb-like structures having an azimuthal angular distance of 90° between each other, it is presently preferred to arrange the two rows of shell pins spaced at an azimuthal angular distance of about 135° from each other in the lower portion of the housing. Thereby eight interdigitations occur during one shaft revolution with equal time intervals between them. Most preferably the upstream row of shell pins, i.e. that row sandwiching a shaft pin on its downward movement first is arranged about 45° below a horizontal plane dividing the housing into its upper and lower portion.

In accordance with a preferred embodiment of this invention, the housing comprises two shell portions which are attached to each other along two straight lines so that the housing can be readily opened. In this embodiment it is particularly advantageous to utilize two shell portions that are segments of a cylinder forming together a full cylinder and to provide each edge of these cylinder segments — which edges are parallel to the cylindrical axis — over its entire length with a reenforcing rod or profile. One row of shell pins can be attached to this reenforcing rod or profile so that this rod acts both to reenforce the housing, to provide it with dimensional stability and to support the pins. The pins extend through holes in the lower segment and are attached to the rod. The two segments are connected to each other via the reenforcing rods by standard means such as nuts and bolts.

The invention will still be more fully understood from the following description of the drawing. The pelleter shown in FIGS. 1 and 2 comprises a cylindrical housing 1 closed by end plates 3 and 5. Attached to the upstream portion of the housing 1 is a carbon black inlet 6 and an inlet 7 for the introduction of a pelleting liquid such as water. This pelleting liquid can contain further ingredients such as $HNO_3$, molasses, etc. At the downstream end of the housing 1 and at the lower portion thereof, the carbon black pelleter is provided with a pellet outlet 9 via which the wet carbon black pellets are withdrawn for further processing. These wet carbon black pellets usually contain in the order of 50% water and are dried before final usage. Within the housing 1 a hollow shaft 11 is coaxially arranged. This shaft 11 is rotatably arranged in bearings 13 and 15. The shaft 11 is provided with pins 17. These pins 17 are attached to the shaft extending essentially radially outwardly toward the inner surface of the housing 1 and in close proximity therewith. The pins 17 are attached to the shaft 11 along a helical pattern. The azimuthal angular distance between the pins along the helical line is 90° so that the pins are arranged in carbon black structures azimuthally 90° apart as can be seen in FIG. 2. The housing 1 is arranged on supports 19 and 21.

The housing 1 consists of two portions 1a and 1b. These two portions are essentially semicylindrical. Each portion, 1a and 1b of the housing, is provided with reenforcing rods 23a and 24a and 23b and 24b, respectively. These reenforcing rods are L-shaped in cross-section. The rods are attached to the semicylinders 1a and 1b in such a manner that one leg of the L-shaped rod is attached to the semicylinder, e.g., by welding, and that the free leg of the L-shaped structure extends in essentially radially outwardly directed flush with the edge of the semicylinder 1a or 1b, respectively. The lower semicylinder 1b of the housing 1 is further equipped with another reenforcing rod or L-shaped profile unit 25. All the reenforcing rods 23a, 23b, 24a, 24b and 25 extend over the entire length of the housing 1. The reenforcing rods 23a and 24a are further connected to each other by two half rings 27 and 28, which in turn are also connected to the corresponding semicylinder 1a, e.g., by welding. Similarly, the reenforcing rods 23b, 24b and 25, as well as the lower half cylinder 1b of the housing, are connected to each other by a half ring 29 which is also attached by, e.g., welding. These half rings 27, 28 and 29 add additional stability to the structure.

The housing 1 is equipped with internal pins 31 and 33, which extend in radially inward direction from the internal surface of the housing. These pins 31 and 33 are connected to the corresponding reenforcing rods 23b and 25, respectively. The semicylinder 1b is provided with holes through while the pins 31 and 33, respectively, extend. The pins 31 and 33 in turn are welded to the reenforcing rod 23b and 25. The shaft 11 with the pins 17 is shown in FIG. 2 in a slightly different position than in FIG. 1, in order to avoid an overlap between the pins 17 and the pins 31 in this cross-sectional drawing. Furthermore, FIG. 1 does not show the entire length of the pelleter. The actual pelleter is provided with 49 pins 17, with 50 pins 31 and with 50 pins 33. Thus every pin 17 during one rotation of the shaft 11 is once sandwiched between 2 pins 33 and is once sandwiched between 2 pins 31.

At the upstream end of the pelleter, the shaft 11 is provided with a flight or auger screw 41. This flight 41 advances the carbon black and the pelleting liquid introduced into the pelleter via inlets 6 and 7, respectively, towards the pelleting section.

As can be seen in FIG. 2, the pins 33 are arranged at an azimuthal position of about 45° below the horizon. Thus during the rotation of the shaft 11 in the direction of arrow 43, the pins 17 are sandwiched between shell pins 33 at approximately 45° below the horizon. The shell pins 31 on the other hand are located only slightly below the horizon so that an azimuthal angular distance of about approximately 135° exists between the row of shell pins 31 and the row of shell pins 33. Thus during one full rotation of the shaft 11, 8 interdigitations of carbon black half pins 17 with comb-like shell pins 31 or 33, respectively, occur. As can also be seen from the drawing, the shell pins 31 and 33 are never sandwiched between shaft pins 17, because the shaft pins 17 are arranged in the pattern of a single helix. The shell pins 33 can also be called upstream shell pins because they interdigitate with the shaft pins 17 first, whereas the shell pins 31 can be called the downstream shell pins because the shaft pins 17 interdigitate with these shell pins last.

An actual example for the dimensions of a carbon black pelleter as described in connection with the drawings is given in the following.

Shell 1 Diameter, Inside: — 23¼ in. — 59 cm.
Shell 1 Length, including auger: — 109 in. — 277 cm.
Diameter of shaft 11: — 6⅝ in. — 16.83 cm.
Axial spacing between pins 17, 31 and 33: — 1¾ in. — 4.45 cm.
Diameter of pins 17, 31 and 33: — ⅝ in. — 1.59 cm.
Length of the pins on the shaft: — 8 3/16 in. — 20.8 cm.
Length of the pins on the shell (measured from the inside surface of housing 1) — 8 3/16 in. — 20.8 cm.
Clearance between the tip of pins 17 and the innersurface of housing 1: — ⅛ in. — 0.32 cm.
Clearance between the tip of pins 31 and 33 and the shaft 11: — ⅛ in. — 0.32 cm.
Clearance between a shaft pin 17 and shell pins 31 and 33: — ¼ in. — 0.64 cm.

A carbon black pelleter of the dimensions just described and when operated at a rotation of 400 rpm of the shaft 11, will have a maximum throughput of 3,000 lbs./hr. (1365 kg/hr.) of carbon black and 3,000 lbs./hr. (1365 kg/hr.) of pelleting liquid so that a maximum of 6,000 lbs./hr. (2,730 kg/hr.) of wet pellets will be withdrawn from such a carbon black pelleter.

Conventional materials of construction such as stainless steel are used for the shaft, shell and particularly the pins, as known in the prior art of wet carbon black pelleters.

Reasonable variations and modifications which will become apparent to those skilled in the art can be made from this invention without departing from the spirit and scope thereof.

I claim:
1. A carbon black pelleter comprising
   a. a housing having an essentially cylindrically shaped internal surface,
   b. a shaft coaxially and rotatably arranged within said housing,
   c. a plurality of shaft pins attached to and extending essentially radially outwardly from said shaft, d. a plurality of shell pins attached to and extending essentially radially inwardly from said housing, with the further provision that e. said shell pins are arranged in at least one row essentially parallel to the shaft axis,
f. all the shell pins are arranged in the lower half of the housing,
g. the shaft pins are arranged in such a pattern with respect to the shell pins that
- aa. the shell pins do not touch the shaft pins during the rotation of the shaft,
- bb. every shaft pin during one rotation of the shaft is at least once sandwiched between two shell pins,
- cc. during the rotation of the shaft there occurs no more than about 1/6 of the total sandwiching of shaft pins between shell pins per shaft revolution at the same time.

2. A pelleter in accordance with claim 1 wherein said shell pins are arranged in two rows of equidistant shell pins.

3. A pelleter in accordance with claim 2 wherein the distance between the centers of the shell pins is about 30% to about 60% larger than the sum of the diameter of one shell pin and the diameter of one shaft pin.

4. A carbon black pelleter in accordance with claim 2 wherein the shaft pins are arranged in the pattern of at least 3 combs having the same azimuthal angular distance from each other.

5. A carbon black pelleter in accordance with claim 4 wherein said two rows of shell pins have an azimuthal angular distance from each other that is an odd multiple of one-half of said azimuthal angular distance of said combs of said shaft pins.

6. A carbon black pelleter in accordance with claim 4 wherein said shaft pins are arranged essentially in the configuration of a single helical line.

7. A carbon black pelleter in accordance with claim 4 wherein said shaft pins are arranged essentially in a helical line such that the azimuthal angular distance between adjacent pins is about 90° and wherein said two rows of shell pins are spaced at an azimuthal angular distance of about 135° from each other.

8. A carbon black pelleter in accordance with claim 7 wherein the upstream row of shell pins is located at an azimuthal position of about 45° below the horizon.

9. A carbon black pelleter in accordance with claim 1 wherein said housing comprises two shell portions which are attached to each other along two straight lines so that the housing can be readily opened.

10. A carbon black pelleter in accordance with claim 9 wherein said shell portions are two segments of a cylinder forming together a full cylinder, wherein each edge of each of said segments is provided over its entire length with a reenforcing rod and wherein at least one row of shell pins is attached to one of the rods being attached to the edge of the lower segment, the shell pins extending through holes in the lower segment and wherein the two segments are connected to each other via the reenforcing rods.

11. A carbon black pelleter in accordance with claim 10 wherein said reenforcing rods have essentially L-shaped cross-section, wherein one side of this L-shaped rod is attached to the edge of the segment at the outside of the segment so that the free side of the L-shaped reenforcing rod extends essentially radially outwardly from the segment and flush with the edge of the segment.

* * * * *